United States Patent
Hirano

(10) Patent No.: US 11,740,592 B2
(45) Date of Patent: Aug. 29, 2023

(54) CONTROL METHOD, CONTROL APPARATUS, MECHANICAL EQUIPMENT, AND RECORDING MEDIUM

(71) Applicant: CANON KABUSHIKI KAISHA, Tokyo (JP)

(72) Inventor: Makoto Hirano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 17/108,055

(22) Filed: Dec. 1, 2020

(65) Prior Publication Data

US 2021/0173357 A1 Jun. 10, 2021

(30) Foreign Application Priority Data

Dec. 10, 2019 (JP) ................. 2019-223201

(51) Int. Cl.
G05B 13/02 (2006.01)
G06N 5/04 (2023.01)
G06N 20/00 (2019.01)

(52) U.S. Cl.
CPC ........... *G05B 13/0265* (2013.01); *G06N 5/04* (2013.01); *G06N 20/00* (2019.01)

(58) Field of Classification Search
CPC ....... G05B 13/0265; G06N 5/04; G06N 20/00
USPC ................................. 700/275–291
See application file for complete search history.

(56) References Cited

U.S. PATENT DOCUMENTS

| 8,682,824 B2 | 3/2014 | Shibuya et al. |
| 9,113,582 B2 * | 8/2015 | Ohba ................. H05K 7/20836 |
| 9,483,049 B2 | 11/2016 | Maeda et al. |
| 10,503,146 B2 | 12/2019 | Kitamura et al. |
| 2012/0166142 A1 * | 6/2012 | Maeda ................. G06K 9/6251 702/185 |
| 2012/0290879 A1 * | 11/2012 | Shibuya ............... G05B 23/021 714/26 |
| 2015/0269120 A1 | 9/2015 | Nakatsugwa et al. |
| 2016/0054360 A1 * | 2/2016 | Higuma ............. G01R 19/0092 324/127 |

(Continued)

FOREIGN PATENT DOCUMENTS

| JP | 2011-059790 A | 3/2011 |
| JP | 2011-070635 A | 4/2011 |

(Continued)

OTHER PUBLICATIONS

Rodrigues, Tiago Koketsu, et al. "Machine learning meets computation and communication control in evolving edge and cloud: Challenges and future perspective." IEEE Communications Surveys & Tutorials 22.1 (2019): pp. 38-67. (Year: 2019).*

(Continued)

*Primary Examiner* — Satish Rampuria
(74) *Attorney, Agent, or Firm* — Venable LLP

(57) ABSTRACT

A control apparatus includes a controller. The controller is configured to obtain a measurement value of a state of mechanical equipment corresponding to a period in which the mechanical equipment reaches a second state from a first state, extract at least one predetermined feature value by using the measurement value, and extract data for machine learning from data of the at least one predetermined feature value on a basis of a separation degree for distinguishing the first state and the second state from each other.

21 Claims, 11 Drawing Sheets

(56) References Cited

U.S. PATENT DOCUMENTS

| | | | |
|---|---|---|---|
| 2018/0164756 A1* | 6/2018 | Yamaguchi | G05B 19/18 |
| 2018/0275631 A1* | 9/2018 | Kitamura | G05B 15/02 |
| 2019/0018392 A1* | 1/2019 | Kubota | B25J 9/163 |
| 2021/0097417 A1* | 4/2021 | Petladwala | G06F 18/10 |

FOREIGN PATENT DOCUMENTS

| | | |
|---|---|---|
| JP | 2015-184823 A | 10/2015 |
| JP | 2018-081523 A | 5/2018 |
| JP | 2018-159981 A | 10/2018 |

OTHER PUBLICATIONS

Sharma, Shree Krishna, and Xianbin Wang. "Toward massive machine type communications in ultra-dense cellular IoT networks: Current issues and machine learning-assisted solutions." IEEE Communications Surveys & Tutorials 22.1 (2019): pp. 426-471. (Year: 2019).*

Mohammadi, Mehdi, et al. "Deep learning for IoT big data and streaming analytics: A survey." IEEE Communications Surveys & Tutorials 20.4 (2018): pp. 2923-2960. (Year: 2018).*

Englehart, Kevin, and Bernard Hudgins. "A robust, real-time control scheme for multifunction myoelectric control." IEEE transactions on biomedical engineering 50.7 (2003): 8 pp. 48-854. (Year: 2003).*

Lent, Craig S., and P. Douglas Tougaw. "A device architecture for computing with quantum dots." Proceedings of the IEEE 85.4 (1997): pp. 541-557. (Year: 1997).*

Chinchilla, Monica, Santiago Arnaltes, and Juan Carlos Burgos. "Control of permanent-magnet generators applied to variable-speed wind-energy systems connected to the grid." IEEE Transactions on energy conversion 21.1 (2006): pp. 130-135. (Year: 2006).*

* cited by examiner

IF SET A AND SET B CAN BE CLEARLY DISTINGUISHED FROM
EACH OTHER AT AN ARBITRARY POINT IN A TIMELINE,
THE SEPARATION DEGREE OF THE FEATURE VALUE
AT THAT POINT HAS A HIGH SCORE.

$$\text{SEPARATION DEGREE} = \frac{(\mu_A - \mu_B)^2}{\sigma_A^2 + \sigma_B^2}$$

$\mu$ : AVERAGE , $\sigma$ : VARIANCE (MACHINE LEARNING)

{W, W', b, b'} are determined such that
the restoration difference
J = Σ (x − y)² becomes small.

$$z = s(Wx + b)$$
$$y = s(W'z + b')$$

s represents an activation function.

(MALFUNCTION PREDICTION)

EVALUATION DATA IS INPUT TO THE POST-LEARNING MODEL, AND THE RESTORATION DIFFERENCE $J = \Sigma (x - y)^2$ AND THE DETERMINATION THRESHOLD VALUE T ARE COMPARED.

RESTORATION DIFFERENCE $J < T$:
OCCURRENCE OF MALFUNCTION IS NOT NEAR

RESTORATION DIFFERENCE $J \geq T$:
OCCURRENCE OF MALFUNCTION IS NEAR

T: DETERMINATION THRESHOLD VALUE

FIG.9

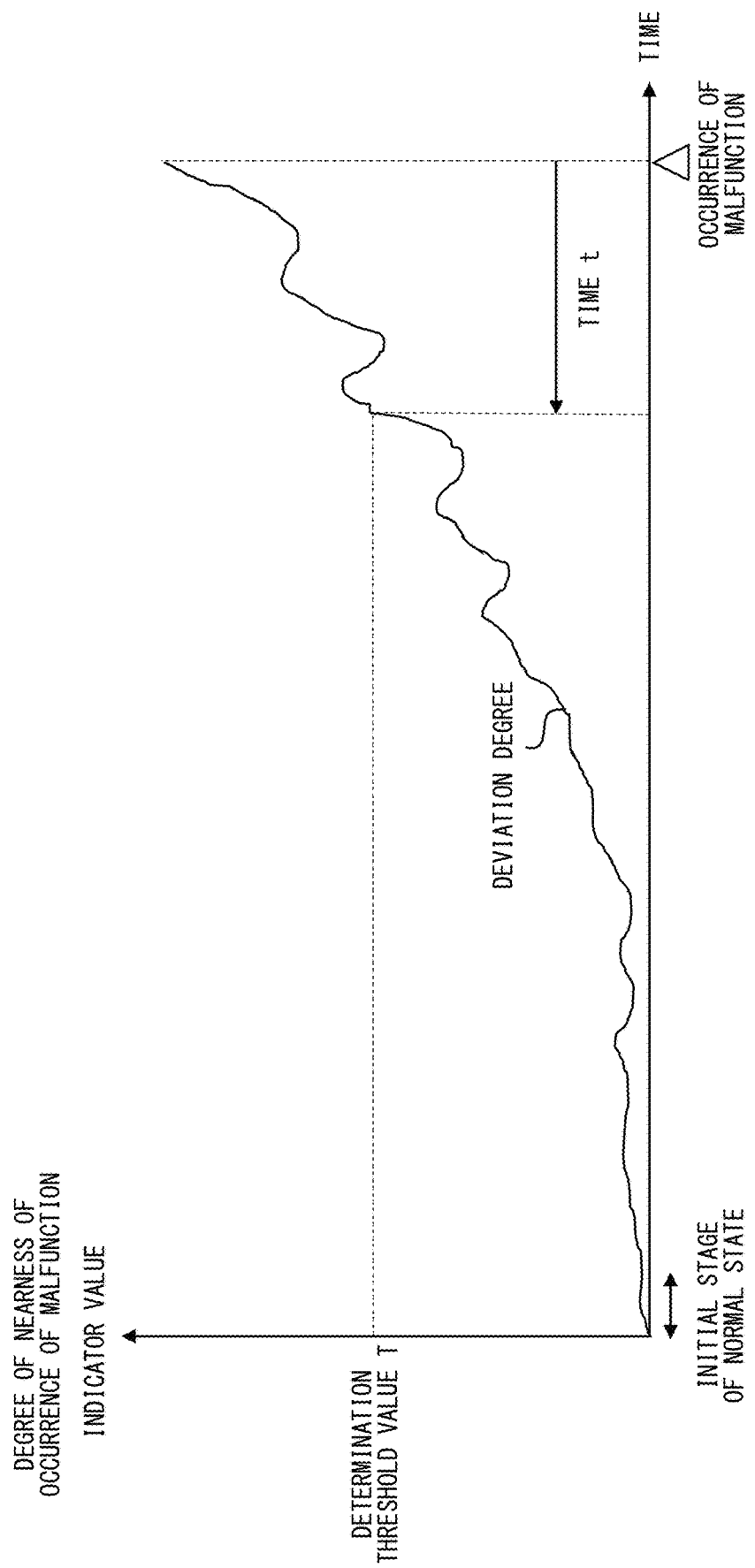

CONTROL METHOD, CONTROL APPARATUS, MECHANICAL EQUIPMENT, AND RECORDING MEDIUM

BACKGROUND OF THE INVENTION

Field of the Invention

The present invention relates to a control method, a control apparatus, mechanical equipment including the control apparatus, a control program, and a computer-readable recording medium.

Description of the Related Art

An operation status of mechanical equipment can change every moment depending on status change of a constituent part or the like. If an operation status within an allowable range based on the use purpose of the mechanical equipment is referred to as a normal state and an operation status out of the allowable range is referred to as a malfunction state, for example, in the case where a manufacturing machine is in the malfunction state, a malfunction such as manufacture of a defected product or stoppage of a manufacturing line occurs.

In the case of a manufacturing machine or the like, generally a maintenance operation is performed regularly or irregularly even if the same operation is repeatedly and continuously performed to suppress the occurrence of the malfunction state as much as possible. Although it is effective to shorten an execution interval between maintenance operations for increasing the preventive safety, since the manufacturing machine or the like is stopped during the maintenance operation, the operation rate of the manufacturing machine or the like is decreased if the frequency of the maintenance operation is excessively increased. Therefore, when occurrence of the malfunction state is near while the machine or the like is still in the normal state, it is desirable that this state can be detected. This is because, in this case, the maintenance operation of the machine or the like may be performed when the approach of the malfunction state is detected, that is, when the occurrence of the malfunction is predicted, and therefore excessive decrease of the operation rate can be suppressed.

As a method for predicting the occurrence of malfunction, a method of preparing a post-learning model generated by machine learning of the state of the mechanical equipment in advance and evaluating the state of the mechanical equipment at the time of the evaluation by using the post-learning model is known. To increase the prediction accuracy, it is important to construct a post-learning model suitable for prediction of malfunction. However, for this, whether or not learning data used for the machine learning is appropriate is important.

For example, Japanese Patent Laid-Open No. 2011-70635 discloses extracting a vector on the basis of a sensor signal indicating the state of mechanical equipment and selecting a feature to be used on the basis of data check of a feature vector. Further, Japanese Patent Laid-Open No. 2011-70635 discloses generating a normal model of the mechanical equipment on the basis of selected learning data.

In addition, regarding selection from a plurality of pieces of learning data prepared for respective seasons in accordance with seasonal change, Japanese Patent Laid-Open No. 2011-59790 discloses selecting a sensor signal that should be focused on and selected in accordance with abnormality, on the basis of an abnormality measure, which is a result of multivariate analysis, and an evaluation result of a degree of influence of each sensor signal.

In mechanical equipment, measurement data is obtained for various parameters to manage the operation status of the mechanical equipment. However, since the frequency of occurrence of malfunction is typically not high, and therefore collecting data of a large number of cases of malfunction is not easy. Meanwhile, measurement data of an enormous size measured for various parameters includes both data related to and data not related to occurrence of malfunction, and is therefore redundant as learning data for machine learning.

Although selecting learning data is recognized in Japanese Patent Laid-Open No. 2011-70635 and Japanese Patent Laid-Open 2011-59790, there is not enough discussion on how the learning data is actually selected and obtained.

Particularly, in the case of mechanical equipment which has low frequency of occurrence of malfunction and from which only data of a few cases of malfunction can be collected, it is difficult to generate a post-learning model of high prediction accuracy by a conventional method.

Therefore, a method by which a malfunction prediction model of high prediction accuracy can be generated even in the case where only data of a few cases of malfunction can be collected from mechanical equipment has been desired.

SUMMARY OF THE INVENTION

According to a first aspect of the present invention, a control method includes obtaining a measurement value of a state of mechanical equipment corresponding to a period in which the mechanical equipment reaches a second state from a first state, extracting at least one predetermined feature value by using the measurement value, and extracting data for machine learning from data of the at least one predetermined feature value on a basis of a separation degree for distinguishing the first state and the second state from each other.

According to a second aspect of the present invention, a control apparatus includes a controller. The controller is configured to obtain a measurement value of a state of mechanical equipment corresponding to a period in which the mechanical equipment reaches a second state from a first state, extract at least one predetermined feature value by using the measurement value, and extract data for machine learning from data of the at least one predetermined feature value on a basis of a separation degree for distinguishing the first state and the second state from each other.

Further features of the present invention will become apparent from the following description of exemplary embodiments with reference to the attached drawings.

BRIEF DESCRIPTION OF THE DRAWINGS

FIG. 9 is a diagram illustrating an example of an operation assisting screen displayed in the embodiment.

FIG. 11 is a schematic diagram for describing a method for determining a determination threshold value according to the embodiment.

DESCRIPTION OF THE EMBODIMENTS

As an embodiment of the present invention, a malfunction prediction system, a control method, a control apparatus, mechanical equipment including the control apparatus, a control program, a computer-readable recording medium, and the like that are used for predicting malfunction of mechanical equipment will be described with reference to drawings. In the description below, in consideration of the use purpose of the mechanical equipment, a state in which the operation status is within an allowable range may be referred to as a normal state, and a state in which the operation status is out of the allowable range may be referred to as a malfunction state or an abnormal state.

Configuration of Functional Blocks

Figure 1:
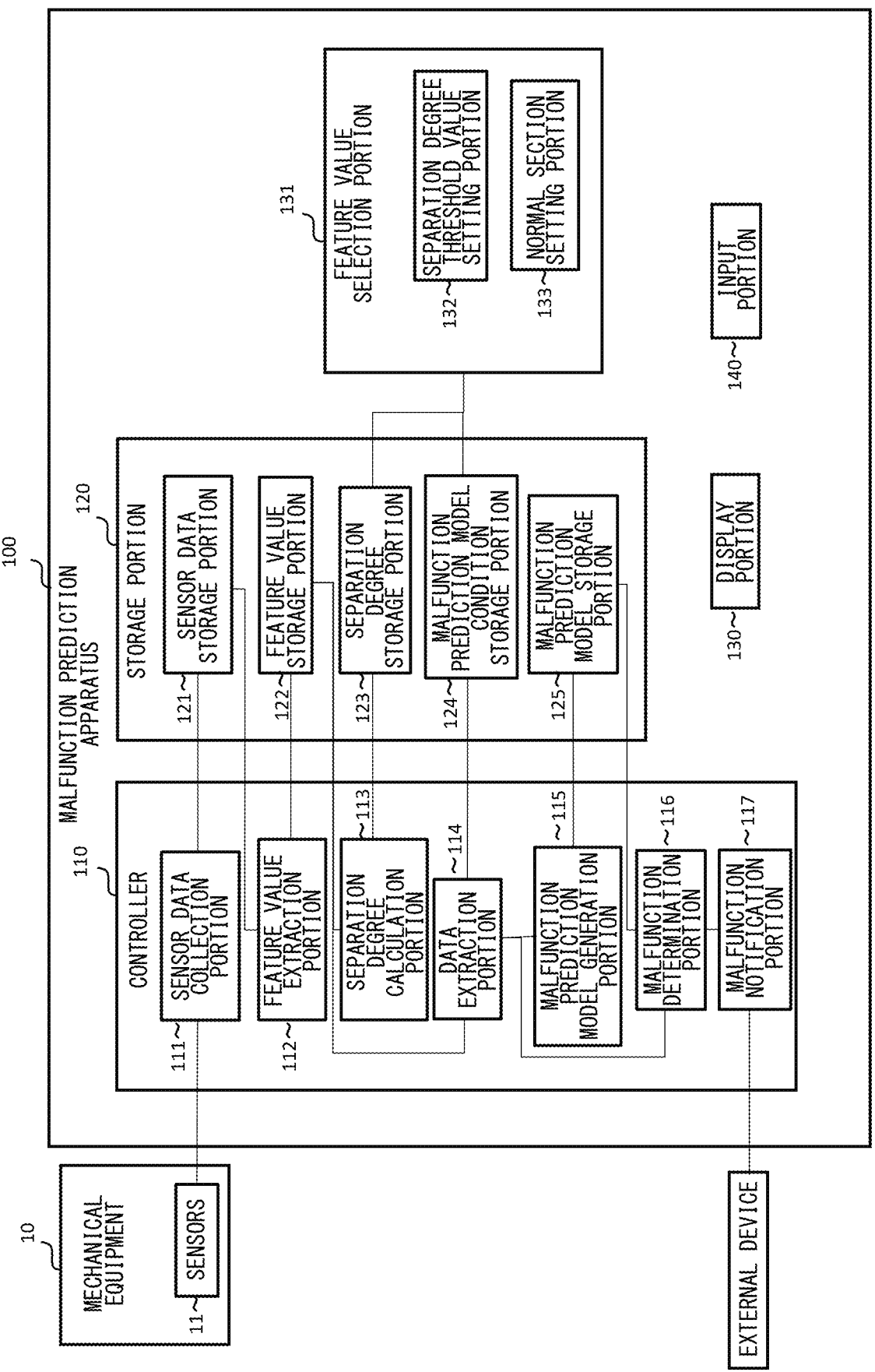
FIG. 1 is a schematic functional block diagram for describing functional blocks included in a malfunction prediction system of an embodiment.

FIG. 1 is a schematic functional block diagram for describing a configuration of functional blocks included in a malfunction prediction system of the embodiment. To be noted, although functional elements required for describing a feature of the present embodiment are indicated as functional blocks in FIG. 1, illustration of general functional elements not directly related to the problem-solving principle of the present invention is omitted. In addition, each functional element illustrated in FIG. 1 is functionally conceptual, and is not necessarily physically configured as illustrated. For example, a specific configuration concerning distribution and integration of each functional block is not limited to the illustrated example, and all or part thereof can be functionally or physically distributed or integrated by arbitrary unit in accordance with the use condition or the like.

As illustrated in FIG. 1, the malfunction prediction system of the embodiment includes mechanical equipment 10, which is a target of diagnosis, and a malfunction prediction apparatus 100.

The mechanical equipment 10 is an industrial device of a various kind that manufactures a product as a resultant article by assembling predetermined workpieces, such as an articulated robot or a manufacturing apparatus installed in a manufacturing line. The mechanical equipment 10 includes various sensors 11 for measuring the state of the mechanical equipment 10. For example, in the case where the mechanical equipment 10 is an articulated robot, a sensor for measuring a current value of a motor driving a joint, an angle sensor of a joint, a sensor for measuring a speed, vibration, or sound, and the like can be provided. However, these are mere examples, and sensors of appropriate kinds and numbers can be provided as the sensors 11 at appropriate positions depending on the kind, use purpose, and the like of the mechanical equipment 10. As the sensors 11, various sensors such as a force sensor, a torque sensor, a vibration sensor, a sound sensor, an image sensor, a distance sensor, a temperature sensor, a humidity sensor, a flow rate sensor, a pH sensor, a pressure sensor, a viscosity sensor, and a gas sensor can be used. To be noted, although only a single sensor 11 is illustrated in FIG. 1 for the sake of convenience of illustration, normally a plurality of sensors are provided.

The mechanical equipment 10 is communicably connected to the malfunction prediction apparatus 100 in a wired or wireless manner, and the malfunction prediction apparatus 100 can obtain data measured by the sensors 11 through communication.

In the stage of generating a malfunction prediction model, the malfunction prediction apparatus 100 selects a feature value highly correlated with occurrence of malfunction of the mechanical equipment 10 by using data collected from the sensors 11, and generates and stores a post-learning model, that is, a malfunction prediction model, by machine learning using the selected feature value. In addition, in an evaluation stage, that is, a malfunction prediction stage, data at the time of evaluation collected from the sensors 11 is input to the post-learning model, a deviation degree is calculated by using an input and an output of the post-learning model, and it is determined whether occurrence of malfunction is near. Hereinafter, functional blocks included in the malfunction prediction apparatus 100 will be sequentially described.

The malfunction prediction apparatus 100 includes a controller 110, a storage portion 120, a feature value selection portion 131, a display portion 130, and an input portion 140.

The controller 110 and the feature value selection portion 131 include a plurality of functional blocks, and these functional blocks are constituted by, for example, a central processing unit: CPU of the malfunction prediction apparatus 100 reading and executing a control program stored in a storage device. Alternatively, part or all of the functional blocks may be constituted by hardware included in the malfunction prediction apparatus 100, such as an application specific integrated circuit: ASIC.

The storage portion 120 includes a sensor data storage portion 121, a feature value storage portion 122, a separation degree storage portion 123, a malfunction prediction model condition storage portion 124, and a malfunction prediction model storage portion 125. Each of these portions included in the storage portion 120 are configured by being appropriately assigned to storage regions of a storage device such as a hard disk drive, a random-access memory: RAM, or a read-only memory: ROM. The storage portion 120 is a data obtaining portion that obtains and stores various data required for processing for execution of malfunction prediction.

The display portion 130 and the input portion 140 are user interfaces included in the malfunction prediction apparatus 100. A display device such as a liquid crystal display or an organic electroluminescence display is used as the display portion 130, and an input device such as a keyboard, a jog dial, a mouse, a pointing device, or a sound input device is used as the input portion 140.

A sensor data collection portion 111 of the controller 110 obtains measurement data from the sensors 11 of the mechanical equipment 10 and stores the measurement data in the sensor data storage portion 121. That is, for example, measurement data concerning the state of the mechanical equipment 10 such as a current, speed, pressure, vibration, sound, temperature of each part, and the like measured in the mechanical equipment 10 is collected and stored.

A feature value extraction portion 112 extracts a feature value indicating characteristics of the operation status (running status) of the mechanical equipment 10 on the basis of the measurement data stored in the sensor data storage portion 121, and stores the feature value in the feature value storage portion 122. For example, as feature value data, the maximum values and/or minimum values of measurement values of the sensors 11 collected in one operation cycle of the mechanical equipment 10 may be extracted, or average values of the measurement values may be calculated. Alternatively, values of sensors in a predetermined period may be converted into a time-series frequency region by integration. In addition, differential values or secondary differential values of sensor values arranged in time-series with respect to time may be used as the feature value data. In addition, in the case where the measurement values themselves of the sensors 11, that is, the raw data of the measurement values, are useful as determinants for detecting whether or not occurrence of malfunction is near, the measurement values themselves may be used as the feature value data. In the present embodiment, the feature value extraction portion 112 extracts or calculates a feature value on the basis of the measurement value of the sensors 11, and generates and stores time-series feature value data in the feature value storage portion 122.

A separation degree calculation portion 113 obtains feature values from the feature value storage portion 122 and calculates the maximum value of the separation degree for each feature value, and stores the maximum value in the separation degree storage portion 123. The separation degree is an indicator indicating whether or not a feature value of the mechanical equipment 10 is sensitive to the change of the state when the mechanical equipment 10 transitions from the normal state to the malfunction state, and the details thereof will be described later.

The feature value selection portion 131 obtains the maximum value of the separation degree of each feature value from the separation degree storage portion 123, and selects a feature value to be used for machine learning on the basis of the obtained information and a threshold value stored in a separation degree threshold value setting portion 132. In addition, a normal section setting portion 133 sets a normal section of the mechanical equipment 10 with reference to a timing when the maximum value of the separation degree has appeared for the selected feature value. The normal section is a period in which the mechanical equipment 10 is in the normal state in which the sign of malfunction has not yet appeared in the feature value. The selected feature value and the normal section are stored in the malfunction prediction model condition storage portion 124 as conditions for extracting learning data for machine learning.

When generating a post-learning model, a data extraction portion 114 extracts data for machine learning from the feature value storage portion 122 on the basis of conditions stored in the malfunction prediction model condition storage portion 124, and outputs the data for machine learning to a malfunction prediction model generation portion 115. In addition, at the time of evaluation, the data extraction portion 114 extracts a feature value of the same kind as the feature value stored in the malfunction prediction model condition storage portion 124, that is, the feature value used for machine learning, from feature value data corresponding to the time of evaluation and stored in the feature value storage portion 122, and outputs the extracted feature value to the malfunction determination portion 116.

When generating a post-learning model, the malfunction prediction model generation portion 115 generates a post-learning model, that is, a malfunction prediction model, by using the data for machine learning input from the data extraction portion 114, and stores the post-learning model in the malfunction prediction model storage portion 125.

At the time of evaluation, a malfunction determination portion 116 inputs the feature value data for evaluation input from the data extraction portion 114 to the post-learning model, that is, a malfunction prediction model stored in the malfunction prediction model storage portion 125, and calculates a deviation degree between the input and output thereof. Then, the malfunction determination portion 116 determines whether or not there is a sign of malfunction by comparing the deviation degree with a determination threshold value.

A malfunction notification portion 117 notifies a determination result of the malfunction determination portion 116 to an external device or displays the determination result on the display portion 130.

Hardware Configuration

Figure 2:
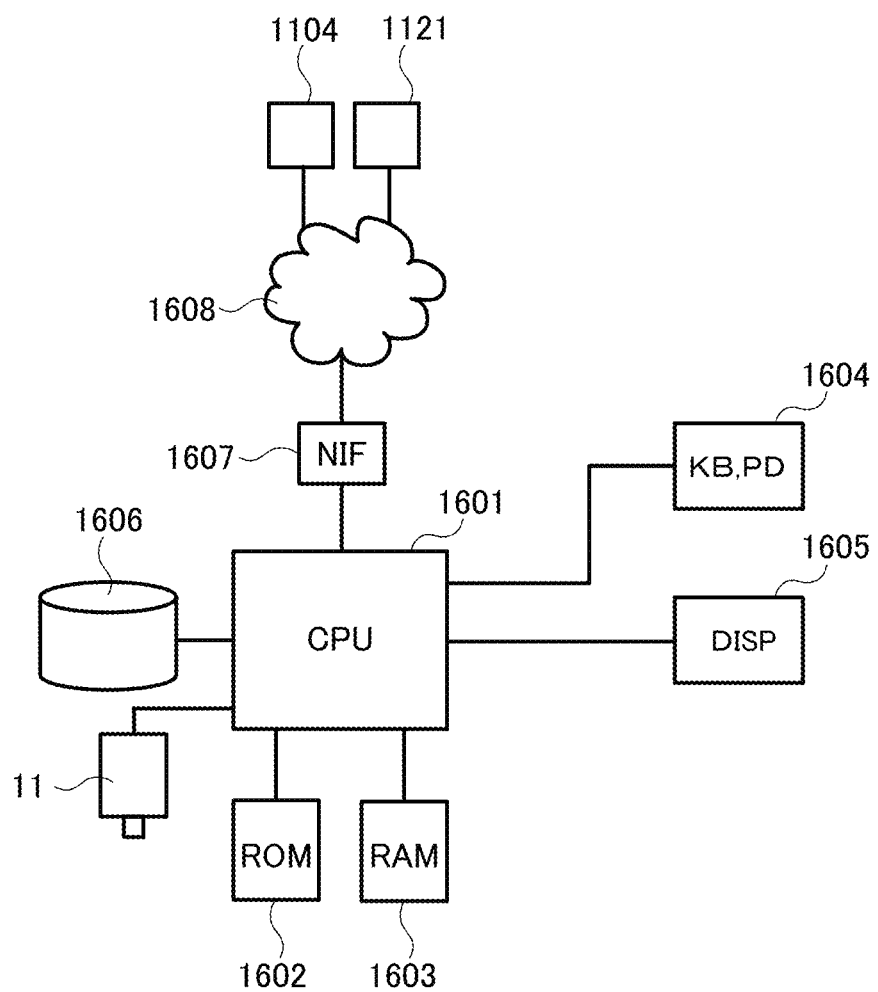
FIG. 2 is a schematic diagram for describing a hardware configuration of the embodiment.

FIG. 2 schematically illustrates an example of a hardware configuration of the malfunction prediction system of the embodiment. The malfunction prediction system can include a personal computer hardware including a CPU 1601 as a main controller, and a ROM 1602 and a RAM 1603 as storage portions as illustrated in FIG. 2. The ROM 1602 can store information such as a processing program and an inference algorithm for realizing a malfunction prediction method that will be described later. In addition, the RAM 1603 is used as a work area or the like for the CPU 1601 when executing the control procedure of the method. In addition, an external storage device 1606 is connected to a control system of the malfunction prediction system. The external storage device 1606 is constituted by a hard disk drive: HDD, a solid-state device: SSD, an external storage portion of another system that is mounted thereon via a network, or the like.

The control program for the CPU 1601 to realize the malfunction prediction method of the present embodiment that will be described later can be stored in a storage portion such as the external storage device 1606 constituted by an HDD or an SSD, or, for example, an electrically erasable programmable ROM region: EEPROM region of the ROM 1602. In this case, the processing program for the CPU 1601 to realize the malfunction prediction method is supplied to each storage portion described above through a network interface: NIF 1607, and can be updated to a new program, that is, a different program. Alternatively, the processing program for the CPU 1601 to realize the malfunction prediction method can be supplied to each storage portion described above via various storage media such as magnetic disks, optical disks, and flash memories and drive devices therefor, and the contents thereof can be updated. The various storage media, storage portions, or storage devices that store a program with which the CPU 1601 can execute a process for realizing the malfunction prediction method constitute computer-readable recording media storing a malfunction prediction procedure of the present invention.

The CPU 1601 is connected to the sensors 11 illustrated in FIG. 1. Although the sensors 11 are illustrated as being directly connected to the CPU 1601 for simpler illustration in FIG. 2, the sensors 11 may be connected to the CPU 1601 via, for example, an IEEE 488, that is, a so-called general-purpose interface bus: GPIB. In addition, the sensors 11 may be connected to the CPU 1601 via a network interface 1607 and a network 1608.

The network interface 1607 can be constitute by, for example, using a communication standard of wired communication such as IEEE 802.3, or a communication standard of wireless communication such as IEEE 802.11 or 802.15.

The CPU 1601 can communicate with other apparatuses 1104 and 1121 via the network interface 1607. For example, in the case where a robot serves as a target of malfunction prediction, the apparatuses 1104 and 1121 may be an integral control apparatus such as a programmable logic control: PLC or a sequencer, a management server, or the like that is disposed for controlling or managing the robot.

In the example illustrated in FIG. 2, an operation portion 1604 and a display apparatus 1605 related to the input portion 140 and the display portion 130 illustrated in FIG. 1 are connected to the CPU 1601 as user interface devices: UI devices The operation portion 1604 can be constituted by a terminal such as a handy terminal, a device such as a key board, a jog dial, a mouse, a pointing device, a sound input device, or a control terminal including these. The display apparatus 1605 may be any device as long as information related to processing performed by the separation degree calculation portion 113, the malfunction prediction model generation portion 115, the malfunction determination portion 116, and the like can be displayed on a display screen thereof, and for example, a liquid crystal display apparatus can be used.

Malfunction Prediction Method

In the present embodiment, the malfunction prediction model generation portion 115 of the malfunction prediction apparatus 100 constructs a post-learning model serving as a malfunction prediction model by so-called unsupervised learning. To learn characteristics of malfunction of mechanical equipment by unsupervised learning, machine learning is performed by using only operation data of a state without malfunction, that is, operation data of a period in which the mechanical equipment is operating normally. In unsupervised learning, the distribution of input data is learned by providing only a large amount of input data to a learning apparatus. That is, unsupervised learning is a method of causing an apparatus that performs processing such as compression, classification, and deformation on input data to learn processing without providing the apparatus with teacher output data corresponding to the input data.

A malfunction prediction method using the method of unsupervised learning will be described in detail. Machine learning is performed by setting a case where the operation status is within an allowable range as a normal state in consideration the use purpose of the mechanical equipment and using only the operation data of the mechanical equipment in the normal state. In the present embodiment, an auto encoder is used as an unsupervised learning model.

The present embodiment is characterized by a method of extracting the data used for machine learning, and in the present embodiment, a feature value sensitive to the change of state at the time of transition of the mechanical equipment from the normal state to the malfunction state is selected, and data of the selected feature value in a predetermined period serving as the normal section is used as learning data.

Figure 3:
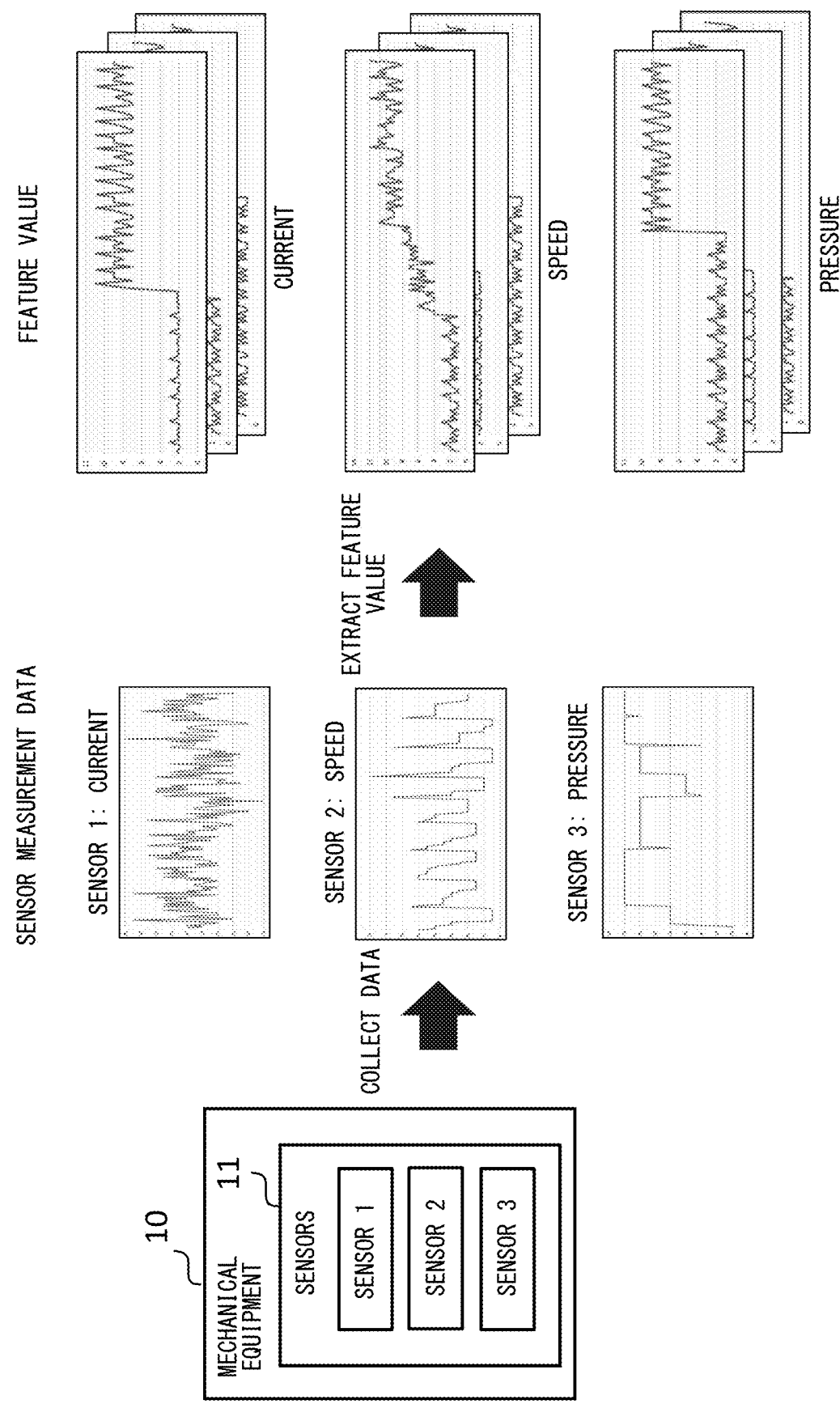
FIG. 3 is a schematic diagram for describing a method for extracting feature values according to the embodiment.

First, extraction of the feature value will be described with reference to FIG. 3. It is assumed that the mechanical equipment 10 serving as a target of malfunction prediction includes the sensors 11 including a sensor 1 that is a current sensor, a sensor 2 that is a speed sensor, and a sensor 3 that is a pressure sensor, as illustrated in FIG. 3. In the malfunction prediction method according to the present embodiment, first, a feature value indicating the operation status (running status) of the mechanical equipment 10 is extracted on the basis of measurement data of each sensor included in the sensors 11. The feature value is extracted by performing integral transform of time-series measurement data of the sensors 11 into a frequency region, calculating primary differential or secondary differential of the measurement data with respect to time, performing filtering processing on the measurement data, extracting a maximum value and a minimum value of a periodic operation from the measurement data, or the like. To be noted, the sensors and processing of measurement data described above are mere examples, and any sensors and processing of measurement data may be employed as long as data suitable for grasping the state of the mechanical equipment can be obtained. In addition, if the state of the mechanical equipment can be easily analyzed by using the measurement data itself of the sensors, the measurement data itself may be used as the feature value without performing any special processing.

FIG. 3 schematically illustrates a state in which time-series data of feature values of 9 kinds illustrated on the right side are extracted by performing 3 kinds of processing on each of measurement data of the sensors 1 to 3.

Next, a method for selecting the feature value that changes sensitively when the mechanical equipment transitions from the normal state to the malfunction state from the extracted feature values will be described.

First, the controller 110 extracts time-series data of feature values corresponding to a period in which the mechanical equipment 10 reaches the malfunction state from the normal state, that is, time-series data of 9 kinds of feature values illustrated on the right side in FIG. 3. Next, a separation degree, which is an indicator of sensitivity to the transition of the mechanical equipment 10 from the normal state to the malfunction state, is calculated for each of the 9 kinds of feature values.

Figure 4:
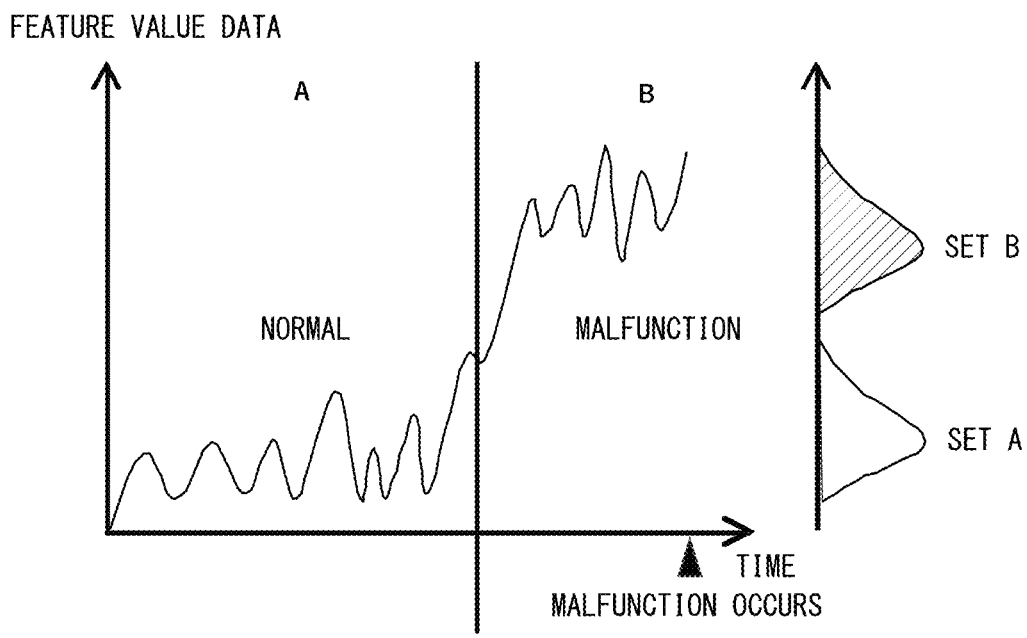
FIG. 4 is a schematic diagram for describing a method for calculating a separation degree according to the embodiment.

A method for calculating the separation degree on the basis of the time-series feature value data will be described with reference to FIG. 4. Here, the method for calculating the separation degree will be described by taking Fisher's linear discriminant analysis as an example. The Fisher's linear discriminant analysis is a method of determining a straight line that distinguishes two sets from each other the best. In the present embodiment, the two sets are the normal state and the malfunction state. Which set a feature value belongs to can be determined by checking on which side of an arbitrary point in a timeline the feature value is positioned.

Specifically, in the case where a data set on the left side of an arbitrary point of time-series feature values is defined as A and a data set on the right side of the arbitrary point is defined as a data set B, an average μ and a variance 6 are obtained for each of the data sets A and B. The separation degree is obtained in accordance with the following formula by using the obtained average μ and the obtained variance 6 of each set.

$$\text{SEPERATION DEGREE SCORE} = \frac{(\mu_A - \mu_B)^2}{\sigma_A^2 + \sigma_B^2} \quad \text{[Formula 1]}$$

The processing described above is performed for each of the 9 kinds of feature values while moving the boundary between the data sets A and B along the timeline, and thus the separation degree in each point in the timeline is obtained. Then, the maximum value among the separation degrees obtained in time series is obtained for each of the 9 kinds of feature values. A feature value whose maximum value of separation degree is larger can be regarded as a feature value having higher distinguishability between the normal state and the malfunction state, that is, higher sensitivity to occurrence of malfunction. In addition, the timing when the maximum separation degree is obtained for the feature value can be regarded as a timing when the normal state and the malfunction state can be distinguished the best for the feature value.

Figure 9:
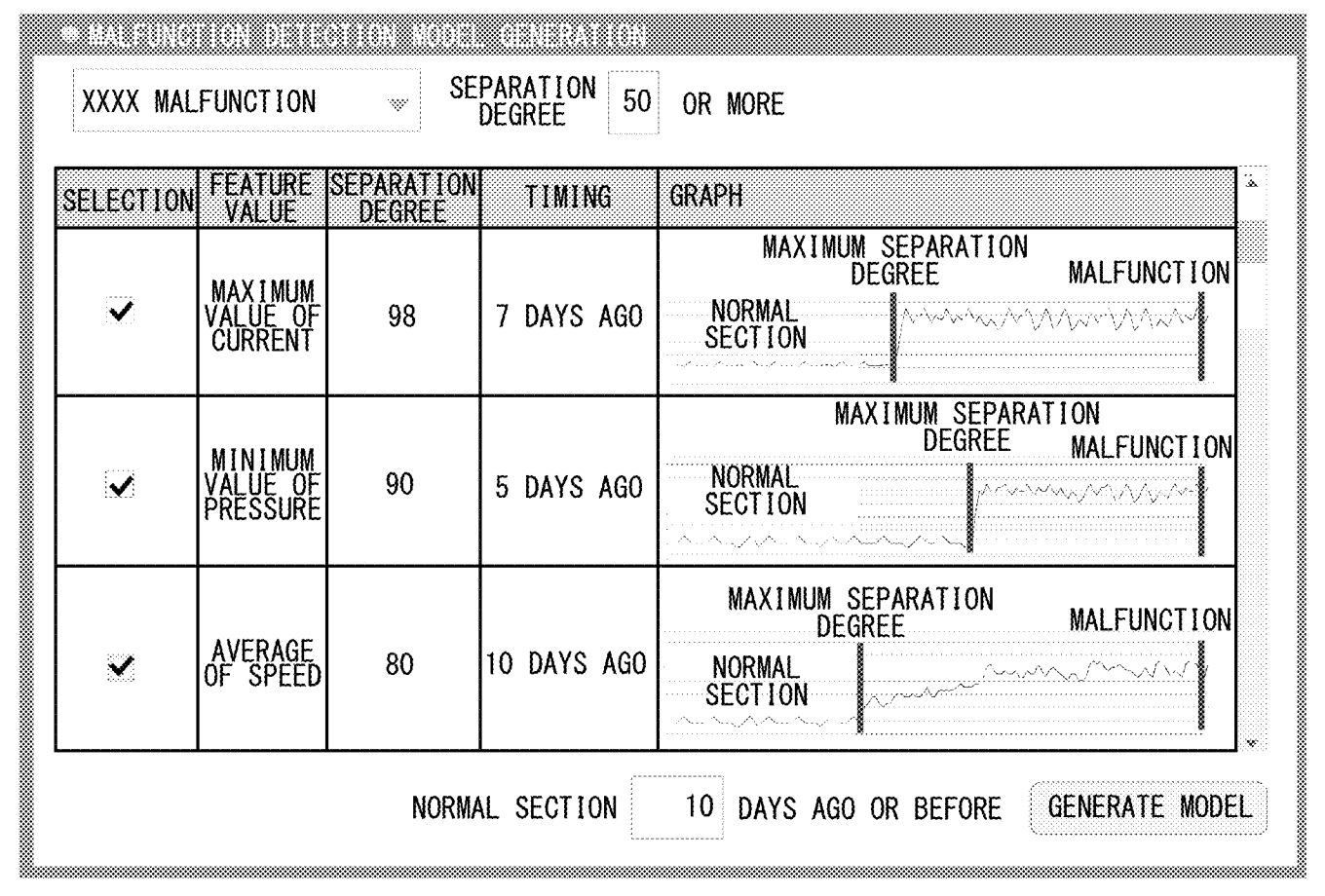

FIG. 9 illustrates an example of an operation assisting screen displayed on the display portion 130 of the malfunction prediction apparatus 100 when an operator performs an operation of selecting the learning data and generating a post-learning model by machine learning.

A field for displaying information for specifying a malfunction case is disposed in an upper-left portion of the screen. This is provided for convenience for an operator to perform operations such as designating, changing, and checking measurement data of which malfunction case is to be used as the learning data.

A field for displaying the range of maximum value of separation degree is disposed in an upper-right portion of the screen. This is provided for convenience for the operator to perform operations such as designating, changing, and checking the range of maximum value of separation degree, which is a condition for selecting the feature value to be used for learning data. FIG. 9 illustrates an example in which the maximum value of the separation degree being 50 or greater is used as a condition for selecting the feature value to be used for the learning data.

In a middle portion of the screen, information related to feature values selected as a match with the selection condition are arranged such that a feature value with a larger maximum value of separation degree is displayed in a higher position. FIG. 9 illustrates an example in which the maximum value of current, the minimum value of pressure, and the average value of speed have matched with the selection condition among the 9 kinds of feature values, and the maximum value of separation degree is greater in this order. For example, regarding the maximum value of current, it is indicated that the maximum value of separation degree being 98 has been detected 7 days before the occurrence of malfunction. To be noted, although feature values extracted from measurement data of different kinds of sensors such as current, speed, and pressure are selected in the example of FIG. 9, this is just a coincidence, and for example, feature values obtained by performing different processing on the measurement value of the same sensor can be also selected.

Graph fields displayed on the right side in the middle portion of the screen each include graphic representation of temporal change graph of a feature value, timing at which the separation value of the feature value reaches the maximum value, and a normal section that will be described below.

In the present embodiment, data of a period in which the mechanical equipment is in the normal state, that is, data of a normal section among time-series data of the selected feature value is used as the learning data, and a normal section designation information field is displayed in a lower portion of the screen. This field is provided for convenience for an operator to instruct setting, checking, and changing a normal section. FIG. 9 illustrates an example in which a period 10 days or more before the occurrence of malfunction is designated as a normal section.

The normal section is set as a section in the past earlier than any of timings in which the maximum value of separation degree has been detected for the selected three feature values. This is because if a timing in which the maximum value of separation degree has been detected for a selected feature value is within the normal section, the data of the feature value in the normal section includes data of the malfunction state, which is inconvenient for accurate machine learning of the characteristics of the normal state. Although the timing at which the maximum value of separation degree has been detected is the earliest for the average value of speed among the selected feature values in the example of FIG. 9, there is no problem because a period earlier than the time point in which the separation degree of the average value of speed reaches the maximum value is set as the normal section.

To be noted, when a period earlier with respect to the time point at which the malfunction occurs, that is, a period in the past farther from the time point of occurrence of malfunction is set as the normal section, data of a normal state particularly closer to the initial state, that is, data of a state in which the mechanical equipment is farther from malfunction can be used for machine learning. To be noted, when a period further earlier than the time point of occurrence of malfunction, that is, a period in the farther past from the time point of occurrence of malfunction is set as the normal section, the normal section becomes temporally shorter, and therefore the amount of data that can be used for machine learning becomes smaller. Therefore, it is desirable that the normal section is set by comprehensively taking the quality and quantity of data into consideration.

Figure 10:
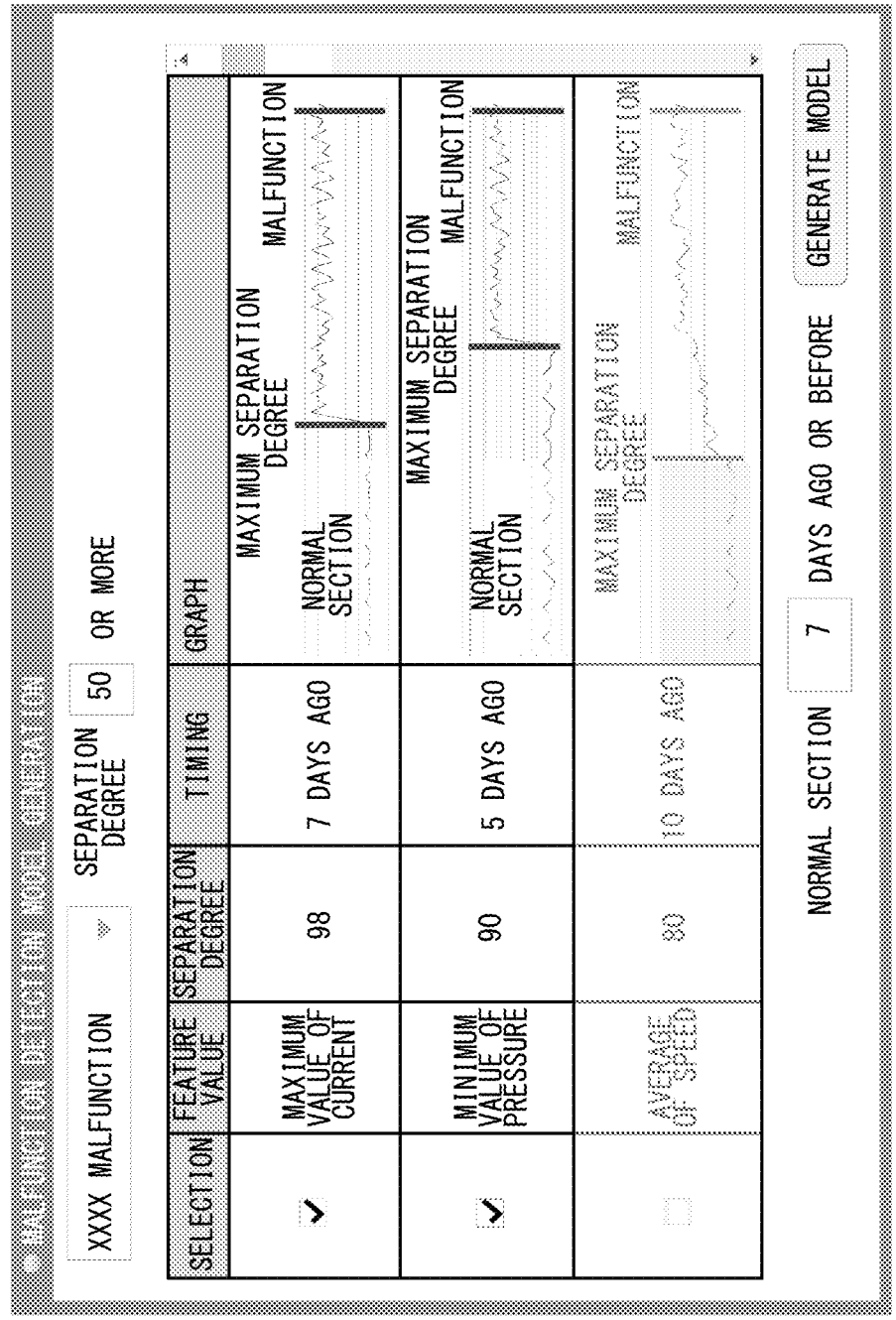
FIG. 10 is a diagram illustrating another example of an operation assisting screen displayed in the embodiment.

Selection fields displayed at the left end of the middle portion of the screen are provided for the convenience for the operator to perform operations such as checking whether or not a feature value is selected, instructing to select/unselect a feature value, and changing selection/nonselection of a feature value. For example, as a result of designating a selection condition that the separation degree is 50 or more, even in the case where the three feature values described above are automatically selected, if the operator desires to cancel selection of part of the three feature values, the selection can be cancelled by unchecking the selection field. FIG. 10 illustrates an example of a display screen in the case where the operator has instructed to exclude the average value of speed from the feature values for machine learning.

As described above, according to the present embodiment, a feature value having high sensitivity for distinguishing the normal state and the malfunction state from each other can be selected, and data of a normal period in which the mechanical equipment is in the normal state can be extracted as data for machine learning for the selected feature value.

A model generation button disposed at the right end of a lower portion of the screen is an icon for the operator to instruct the malfunction prediction apparatus to start the operation of generating the malfunction prediction model by machine learning using the selected feature value.

Figure 5:
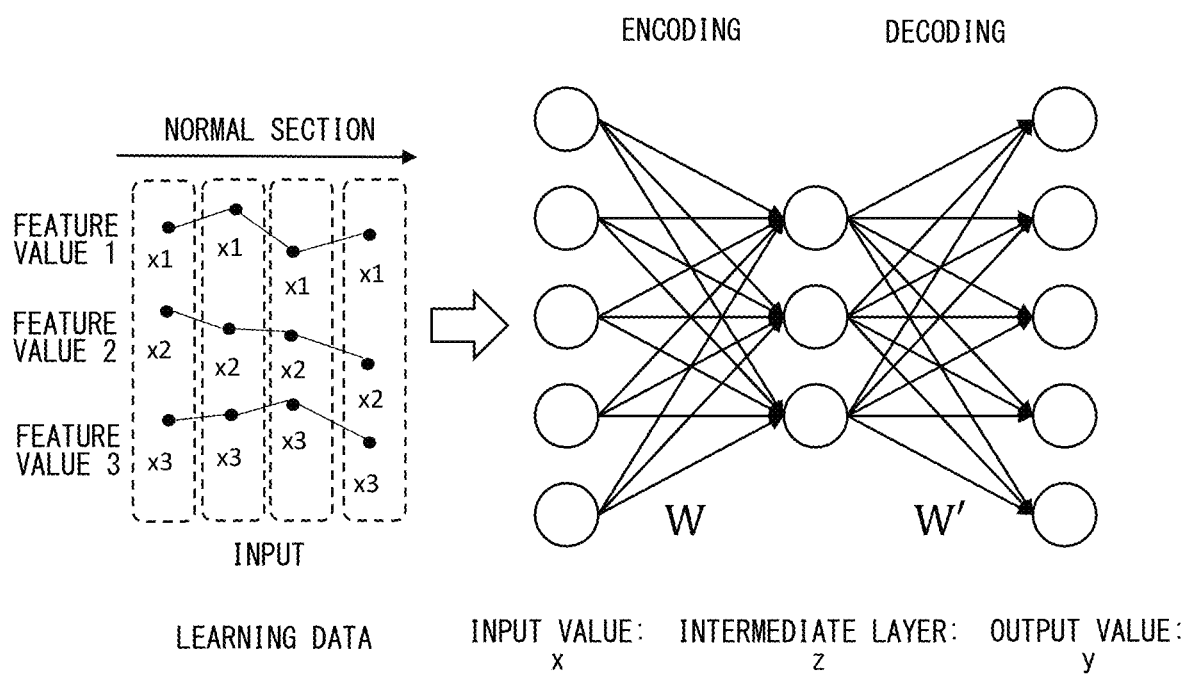
FIG. 5 is a schematic diagram for describing a machine learning method according to the embodiment.

Next, a method of causing an auto encoder to perform machine learning by using the learning data extracted as described above will be described with reference to FIG. 5, which is a schematic diagram. The auto encoder is a kind of neural network that compresses, that is, encodes the input learning data into data of a smaller data size and then restores, that is, decodes the data. The auto encoder learns "a parameter for appropriately compressing and restores the input data", that is, characteristics of the input data.

The auto encoder encodes an input value x to compress the input value x into an intermediate layer z. Then, the auto encoder decodes the intermediate layer z to restore the intermediate layer z as an output value y. The auto encoder performs machine learning such that a restoration difference J between the input value and the output value becomes smaller.

That is, the auto encoder determines W and b of Formula 2 below and W' and b' of Formula 3 below such that the restoration difference J in Formula 4 below becomes smaller. To be noted, s represents an activation function.

$$z = s(Wx + b) \quad \text{[Formula 2]}$$

$$y = s(W'z + b') \quad \text{[Formula 3]}$$

$$\text{RESTORATION DIFFERENCE } J = \Sigma(x - y)^2 \quad \text{[Formula 4]}$$

When data having characteristics similar to those of the learning data is input, the auto encoder that has performed learning outputs an output value with a small restoration difference by encoding and decoding using a parameter obtained by the learning. The auto encoder that has performed learning will be sometimes described as a post-learning model or a malfunction prediction model. In contrast, when data having characteristics different from the learning data is input to the post-learning model, the encoding and decoding cannot be performed successfully by using the parameter obtained by the learning, and therefore the restoration difference is large.

In the present embodiment, to utilize this nature, machine learning is performed by inputting the data of the normal section of the selected feature value as the input value x to the auto encoder.

In addition, when performing malfunction prediction, data at the time of evaluation of a feature value of the same kind as a feature value selected during learning is input as the input value x to the post-learning model to output the output value y. Then, the restoration difference between the input value x and the output value y is calculated, and the restoration difference, that is, the deviation degree between the input and output is used as an indicator indicating the degree of deviation of the mechanical equipment from the normal state.

In addition, in the present embodiment, a determination threshold value used for determining whether or not the occurrence of malfunction of the mechanical equipment is near by using the deviation degree is set in advance. To set the determination threshold value, first, feature value data based on the sensor data of the actual mechanical equipment corresponding to a period in which the occurrence of malfunction is reached from the normal state is input, and the temporal change of the deviation degree until the occurrence of malfunction is studied. As this feature value data, data of an extracted feature value that is of the same kind as a feature value selected during learning, that is, a feature value obtained by performing the same processing on measurement data of the same sensor, is used. The determination threshold value for determining that the occurrence of malfunction is near is set on the basis of the temporal change of the deviation degree. In the case where the deviation degree is equal to or greater than the determination threshold value, it is determined that the occurrence of malfunction of the mechanical equipment is near, that is, there is a sign of malfunction.

FIG. 11 is a diagram for describing a method of determining the determination threshold value in detail. In the graph of FIG. 11, the horizontal axis represents the time, and the vertical axis represents an indicator value indicating the degree of nearness of the occurrence of malfunction, that is, the deviation degree between the input and output of the post-learning model, and the graph indicates the temporal change of the indicator value from the initial stage of the normal state to the occurrence of the malfunction, that is, the abnormal state. A case where it is desired that a predetermined time t is secured before a malfunction occurs after the malfunction prediction apparatus has predicted and notified that the occurrence of malfunction is near, that is, a case where it is desired that the malfunction prediction apparatus predicts the occurrence of malfunction at a time earlier than the occurrence of malfunction by the predetermined time t is assumed. In this case, the indicator value, that is, the deviation degree between the input and output of the post-learning model, at the time earlier than the occurrence of malfunction by the predetermined time t as illustrated is set as a determination threshold value T for malfunction prediction. This serves as a determination threshold value setting step.

Figure 6:
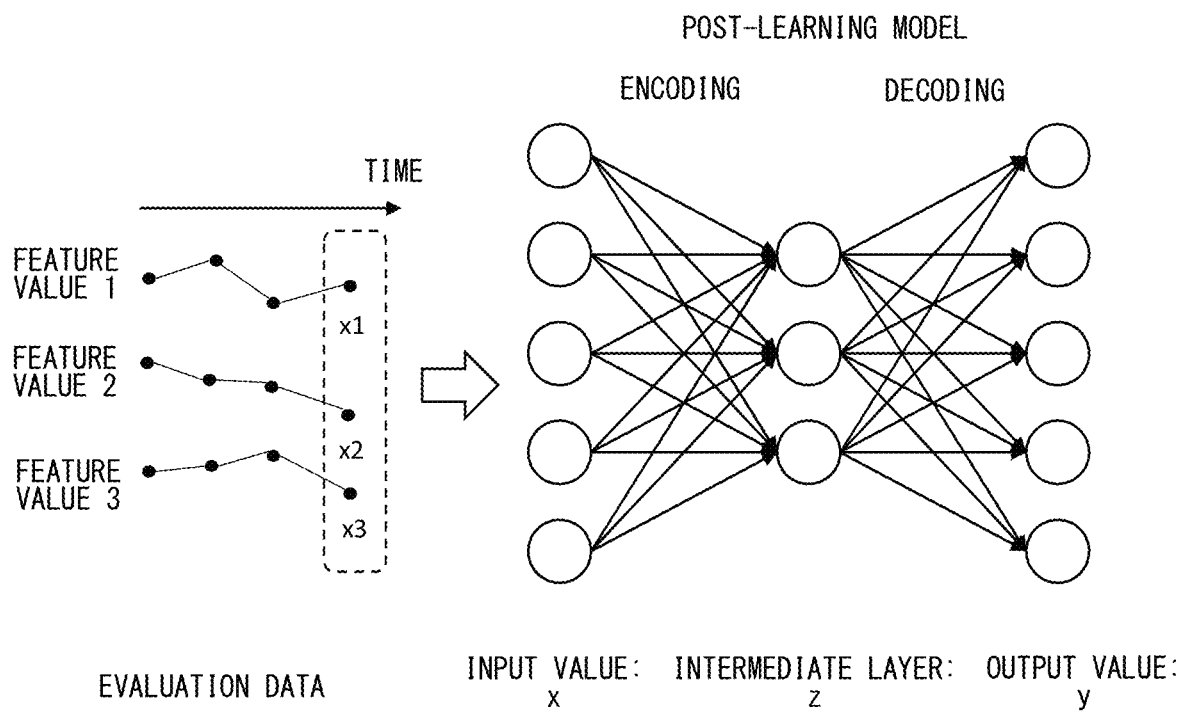
FIG. 6 is a schematic diagram for describing a malfunction prediction method according to the embodiment.

Malfunction prediction using the post-learning model and the determination threshold value described above will be described. FIG. 6 is a schematic diagram for describing the malfunction prediction method using the auto encoder.

Evaluation data indicating the operation status of the mechanical equipment at the time of evaluation is input to the post-learning model, and the deviation degree indicating how much the state of the mechanical equipment is different from the learned normal state is calculated by using the input value and output value. As the evaluation data, data at the time of evaluation of a feature value of the same kind as the feature value selected during the learning, that is, a feature value obtained by performing the same processing on measurement data of the same sensor is used. Specifically, the evaluation data is input to the malfunction prediction model as illustrated in FIG. 6, and the restoration difference J between the output value y and the input value x of the malfunction prediction model obtained as a result of the input is calculated and used as the deviation degree from the normal state. In the present embodiment, this deviation degree is used as the indicator value indicating the degree of nearness of the occurrence of malfunction. In the case where the deviation degree, that is, the restoration difference J is equal to or greater than the determination threshold value T, it is determined that the time to the occurrence of malfunction is equal to or shorter than the predetermined time t, that is, it is determined that there is a sign of malfunction. Conversely, in the case where the deviation degree, that is, the restoration difference J is less than the determination threshold value T, it is determined that the time to the occurrence of malfunction is longer than the predetermined time t, that is, it is determined that there is no sign of malfunction.

Processing Procedure

Next, the procedure of processing performed by the malfunction prediction apparatus 100 will be described with reference to flowcharts of FIGS. 7 and 8.

Figure 7:
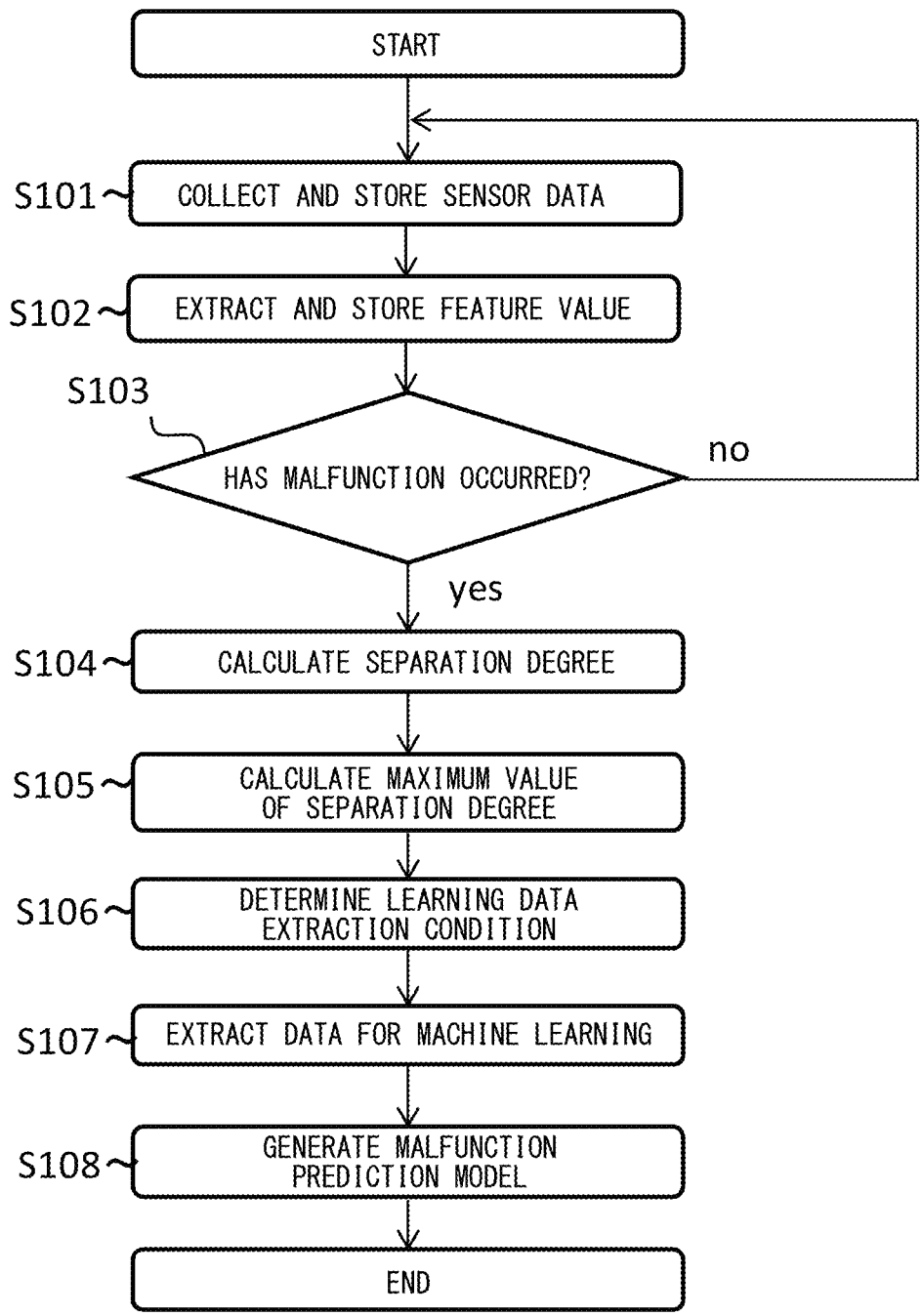
FIG. 7 is a flowchart illustrating a processing procedure for generation of a malfunction prediction model according to the embodiment.

FIG. 7 is a flowchart illustrating the processing procedure for generating a malfunction prediction model.

First, in step S101, the sensor data collection portion 111 of the malfunction prediction apparatus 100 obtains measurement data from the sensors 11 for measuring the state of the mechanical equipment 10, and stores the measurement data in the sensor data storage portion 121. This serves as a measurement data obtaining step.

Next, in step S102, the feature value extraction portion 112 extracts a feature value indicating the characteristics of the operation status of the mechanical equipment 10 on the basis of the sensor data stored in the sensor data storage portion 121, and stores the extracted feature value in the feature value storage portion 122. This serves as a feature value extraction step.

Next, in step S103, the controller 110 determines whether or not a malfunction has occurred in the mechanical equipment 10. The occurrence of malfunction may be input to the controller 110 of the malfunction prediction apparatus 100 via the input portion 140 by the user, or input to the controller 110 of the malfunction prediction apparatus 100 via a network interface: NIF 1607 by an unillustrated control portion of the mechanical equipment 10.

In the case where no malfunction has occurred, that is, in the case where the result of step S103 is no, the process returns to step S101, and steps S101 and S102 are repeated until a malfunction occurs.

In the case where a malfunction has occurred, that is, in the case where the result of step S103 is yes, the process proceeds to step S104, and the separation degree calculation portion 113 obtains feature values from the feature value storage portion 122 and calculates a separation degree for each feature value.

Next, in step S105, the separation degree calculation portion 113 extracts the maximum value of separation degree from time-series data of the calculated separation degree for each feature value, and stores the maximum value in the separation degree storage portion 123. That is, the maximum value of separation degree in a period in which the malfunction state is reached from the normal state is obtained for each of a plurality of feature values. This serves as a separation degree maximum value obtaining step.

Next, in step S106, the feature value selection portion 131 obtains the maximum value of separation degree for each feature value from the separation degree storage portion 123, and selects a feature value to be used for machine learning on the basis of a threshold value stored in the separation degree threshold value setting portion 132. In addition, the normal section setting portion 133 sets the normal section of the mechanical equipment, which is a normal state period in which a sign of malfunction has not appeared in the feature value yet, with reference to the timing in which the maximum value of separation degree of the selected feature value is reached. The selected feature value and information about the normal section are stored in the malfunction prediction model condition storage portion 124 as conditions for extracting learning data for machine learning.

Next, in step S107, the data extraction portion 114 extracts data for machine learning from the feature value storage portion 122 on the basis of the extraction conditions stored in the malfunction prediction model condition storage portion 124, and outputs the data for machine learning to the malfunction prediction model generation portion 115. That is, data of the selected feature value in the normal section is extracted and output. This serves as a learning data extraction step.

Next, in step S108, the malfunction prediction model generation portion 115 generates a post-learning model, that is, a malfunction prediction model, by using the data for machine learning input from the data extraction portion 114, and stores the post-learning model in the malfunction prediction model storage portion 125. This serves as a post-learning model generation step.

A post-learning model, that is, a malfunction prediction model can be generated by performing the series of processing described above.

Next, a procedure of processing performed by the malfunction prediction apparatus 100 by using the generated post-learning model, that is, the malfunction prediction model, when determining whether or not the occurrence of malfunction of the mechanical equipment 10 is near will be described.

Figure 8:
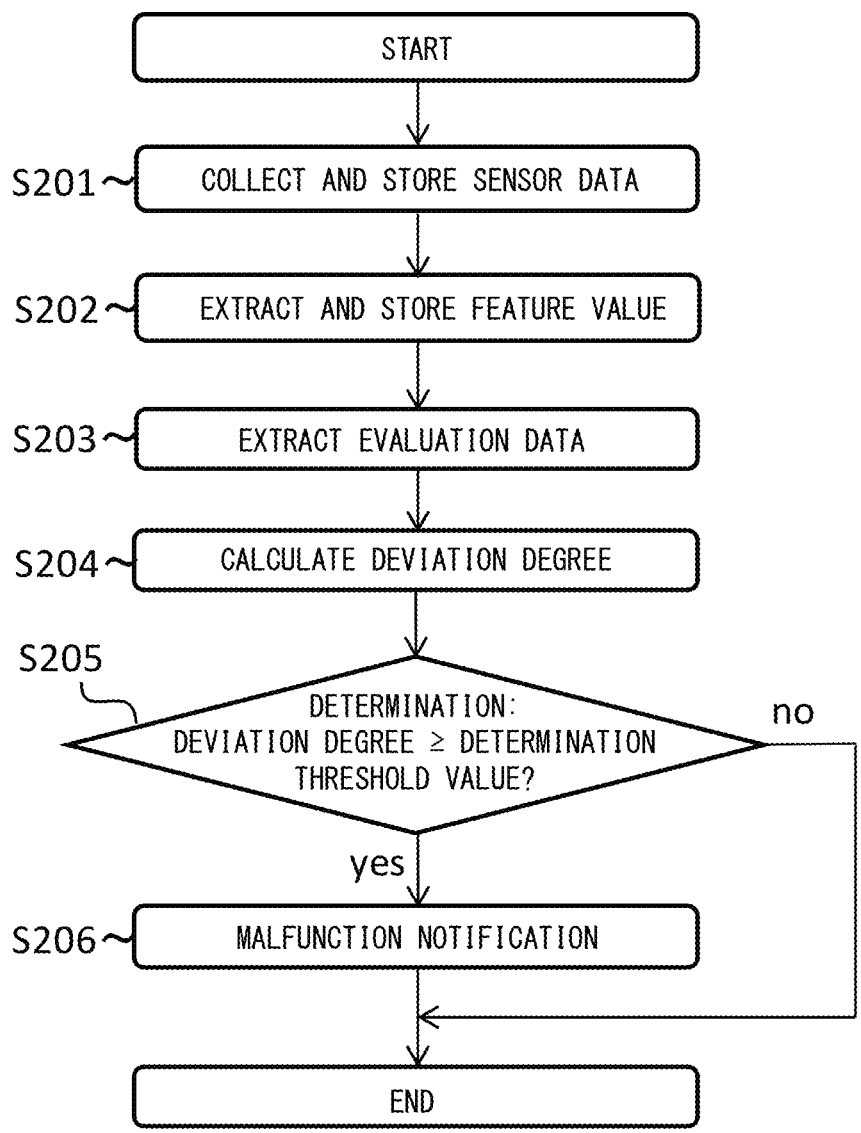
FIG. 8 is a flowchart illustrating a processing procedure of malfunction prediction according to the embodiment.

FIG. 8 is a flowchart illustrating a processing procedure. The processing for determining whether or not the occurrence of malfunction of the mechanical equipment 10 is near is started by, for example, a user instructing the start of the processing by using the input portion 140 of the malfunction prediction apparatus 100. Alternatively, the control program of the malfunction prediction apparatus 100 may be configured such that the processing is automatically started in accordance with the operation time of the mechanical equipment 10.

When the processing is started, in step S201, the sensor data collection portion 111 of the malfunction prediction apparatus 100 obtains the measurement data from the sensors 11 that measure the state of the mechanical equipment 10, and stores the measurement data in the sensor data storage portion 121.

Next, in step S202, the feature value extraction portion 112 extracts a feature value indicating the characteristics of the operation status of the mechanical equipment 10 on the basis of the sensor data stored in the sensor data storage portion 121, and stores the feature value in the feature value storage portion 122.

Next, in step S203, the data extraction portion 114 obtains information stored in the malfunction prediction model condition storage portion 124, that is, information about the kind of feature value used for machine learning, and extracts a feature value of the same kind as that of the feature value used for machine learning from the feature value storage portion 122. The extracted feature value is output to the malfunction determination portion 116 as evaluation data. This serves as an evaluation feature value extraction step.

Next, in step S204, the malfunction determination portion 116 inputs the feature value data for evaluation input from the data extraction portion 114 to the post-learning model, that is, the malfunction prediction model stored in the malfunction prediction model storage portion 125, and calculates the deviation degree between the input and output.

Next, in step S205, the malfunction determination portion 116 compares the calculated deviation degree with the determination threshold value, and thus determines whether or not the occurrence of malfunction of the mechanical equipment 10 is near, that is, whether or not there is a sign of malfunction.

In the case where the deviation degree is equal to or greater than the determination threshold value, that is, in the case where the result of step S205 is yes, it is determined that the occurrence of malfunction in the mechanical equipment 10 is near, and the process proceeds to step S206.

In step S206, the malfunction determination portion 116 issues a notification instruction to the malfunction notification portion 117. The malfunction notification portion 117 having received the notification instruction notifies the determination result of the malfunction determination portion 116 to the user. When performing the notification, information related to the determination may be stored in the storage portion 120 or provided to an external device through an external interface in addition to performing the notification to the user through the user interface. To perform the notification to the user, processing such as displaying the determination result on the display portion 130 of the malfunction prediction apparatus 100, outputting a voice message, or printing the determination result on a medium such as paper may be performed. When the notification to the user is completed, the process is finished.

In the case where the deviation degree is less than the determination threshold value, that is, in the case where the result of step S205 is no, it is determined that the occurrence of malfunction of the mechanical equipment 10 is not near, that is, it is determined that there is no sign of malfunction, and the process is finished. To be noted, even in the case where it has been determined that there is no sign of malfunction, this result may be notified to the user, and information related to the determination may be stored in a storage device or provided to an external device through an external interface.

As described above, according to the present embodiment, a feature value having high correlation with occurrence of malfunction can be, on the basis of cases of malfunction, selected from various feature values indicating the state of the mechanical equipment. A malfunction model of high prediction accuracy can be generated even in the case where only a few cases of malfunction are collected. That is, even in the case where there are only a few cases of malfunction, a feature value having high distinguishability for distinguishing the normal state and the malfunction state from each other can be selected as data for machine learning from various feature values indicating the state of the mechanical equipment. By performing machine learning by selecting a feature value of high correlation with occurrence of malfunction, a post-learning model that predicts occurrence of malfunction with high accuracy in advance can be generated.

Other Embodiments

Embodiments of the present invention are not limited to the embodiment described above, and can be modified in many ways within the technical concept of the present invention.

For example, although a malfunction prediction model is generated by using an auto encoder by the method of so-called unsupervised learning in the embodiment, the present invention can be also applied to a case where the malfunction prediction model is generated by using a method of so-called supervised learning. The supervised learning is a method of constructing a model that predicts a result from an input, that is, a post-learning model that inductively obtains the relationship between input and output, by providing an enormous number of data sets of input and a result thereof, which is the label in this case, to a learning apparatus and causing the learning apparatus to learn the characteristics of the data sets.

In addition, although a method of using a neural network has been described as an example of machine learning in the embodiment, the method of machine learning is not limited to this, and for example, genetic programming, inductive logic programming, a support vector machine, or the like may be used. Although a general-purpose calculator or a general-purpose processor may be used as the apparatus that performs machine learning, high-speed processing can be performed by using a graphics processing unit having a GPGPU function, a large-scale PC cluster, or the like.

In addition, although the feature value selection portion 131 selects a feature value to be used for machine learning on the basis of the maximum value of separation degree for each feature value and a predetermined threshold value stored in the separation degree threshold value setting portion 132 in step S106 in the embodiment, this selection may be made by without using a threshold value. For example, feature values may be arranged in the order from a greater maximum value of separation degree to a smaller maximum value of separation degree, and feature values up to a predetermined placement, that is, a predetermined number of feature values may be selected for machine learning.

As described above, although a malfunction prediction model having high prediction accuracy for malfunction can be generated also by using data of only a few cases of malfunction according to the embodiment, performing additional machine learning in the case where a new case of malfunction has occurred is not prohibited. That is, after generating a post-learning model, additional learning may be performed by using data of a new case of malfunction. In this case, a feature value to be selected and the determination threshold value may be changed with reference to measurement data related to the case of malfunction that is to be subjected to additional learning.

The malfunction prediction apparatus of the present invention can be applied to malfunction prediction of various machines and equipment such as industrial robots, service robots, and processing machines that operate under numerical control by a computer. A malfunction prediction system may be configured by integrating the mechanical equipment and the malfunction prediction apparatus, or the malfunction production apparatus may be provided as a part of the mechanical equipment.

The present invention can be also realized by supplying a program that realizes one or more functions of the embodiment to a system or an apparatus via a network or a recording medium and one or more processors of a computer of the system or the apparatus reading out and executing the program. In addition, the present invention can be also realized by a circuit that realizes one or more functions, for example, an ASIC.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-223201, filed Dec. 10, 2019, which is hereby incorporated by reference herein in its entirety.

What is claimed is:

1. A control method comprising:
obtaining a measurement value of a state of mechanical equipment corresponding to a period in which the mechanical equipment reaches a second state from a first state;
obtaining at least one predetermined feature value by using the measurement value;
selecting learning data for machine learning from data of the at least one predetermined feature value on a basis of a separation degree for distinguishing the first state and the second state from each other, the selecting including setting a period on a basis of the separation degree, with the period being a period in which the mechanical equipment is in the first state, and with the at least one predetermined feature value corresponding to the period as the learning data for machine learning; and
generating a post-learning model by machine learning using the learning data for machine learning.

2. The control method according to claim 1, wherein the obtaining the at least one predetermined feature value comprises:
obtaining a plurality of feature values by using the measurement value; and
selecting the at least one predetermined feature value from the plurality of feature values on the basis of the separation degree.

3. The control method according to claim 2, further comprising obtaining a maximum value of the separation degree and a timing at which the separation degree reaches the maximum value for each of the plurality of feature values,
wherein the at least one predetermined feature value is selected on a basis of the maximum value of the separation degree of each of the plurality of feature values, and
wherein the data of the at least one predetermined feature value corresponding to the period is extracted as the learning data for machine learning, the period being set on a basis of the timing for the at least one predetermined feature value that has been selected.

4. The control method according to claim 3, wherein the selecting the at least one predetermined feature value comprises comparing each of the maximum value of the separation degree with a predetermined threshold value to select the at least one predetermined feature value.

5. The control method according to claim 3, wherein the selecting the at least one predetermined feature value comprises selecting a predetermined number of feature values having largest maximum values of the separation degree as the at least one predetermined feature value.

6. The control method according to claim 3, wherein the period is set as a period earlier than an earliest timing among the timings of the predetermined feature values.

7. The control method according to claim 3, further comprising displaying, on a display portion, information related to selection of the at least one predetermined feature value and/or information related to extraction of data corresponding to the period in which the mechanical equipment is in the first state.

8. The control method according to claim 3, further comprising displaying, on a display portion, information related to the maximum value of the separation degree, information related to the timing at which the separation degree has reached the maximum value, and/or information related to designation of the period in which the mechanical equipment is in the first state.

9. The control method according to claim 1, further comprising
determining a state of the mechanical equipment by using the post-learning model.

10. The control method according to claim 9, wherein the determining of the state of the mechanical equipment comprises:
inputting, to the post-learning model, data of a feature value of the same kind as the at least one predetermined feature value that corresponds to the period in which the mechanical equipment reaches the second state from the first state;
obtaining a deviation degree between input data input to the post-learning model and output data output from the post-learning model;
setting a determination threshold value on a basis of temporal change of the deviation degree in a period in which the mechanical equipment reaches the second state from the first state;
obtaining a feature value of the same kind as the at least one predetermined feature value as an evaluation feature value by using a measurement value related to the state of the mechanical equipment corresponding to a time of evaluation; and
obtaining an indicator value indicating a degree of deviation of the mechanical equipment from the first state by using the evaluation feature value and the post-learning model, and determining the state of the mechanical equipment corresponding to the time of evaluation by using the indicator value and the determination threshold value.

11. The control method according to claim 9, wherein the generating the post-learning model comprises generating the post-learning model by machine learning using an auto encoder.

12. The control method according to claim 9, further comprising notifying a result of determination of the state of the mechanical equipment by a controller.

13. A non-transitory computer-readable recording medium storing a control program that causes a computer to perform the control method according to claim 1.

14. The control method according to claim 1, wherein the separation degree is obtained on a basis of a first average of a first data set, a first variance of the first data set, a second average of a second data set, and a second variance of the second data set, and
wherein the first data set is the data, of a part before a predetermined timing in time-series, of the at least one predetermined feature value, and the second data set is the data, of a part after the predetermined timing in time-series, of the at least one predetermined feature value.

15. The control method according to claim 1, further comprising displaying on a display portion a screen for a user to set the separation degree.

16. The control method according to claim 1, further comprising displaying on a display portion predetermined feature values in descending order of the separation degree.

17. The control method according to claim 1, wherein the selecting includes displaying on a display portion a screen for a user to set whether the data of the at least one predetermined feature value is to be selected for learning data for machine learning.

18. The control method according to claim 1, wherein the first state corresponds to a normal state of the mechanical equipment, and the second state corresponds to a malfunction state of the mechanical equipment.

19. A control apparatus comprising a controller, the controller comprising:
at least one processor and at least one memory, the at least one processor being configured to read and execute at least one program stored in the at least one memory that causes the control apparatus to:
obtain a measurement value of a state of mechanical equipment corresponding to a period in which the mechanical equipment reaches a second state from a first state,
obtain at least one predetermined feature value by using the measurement value, and
select learning data for machine learning from data of the at least one predetermined feature value on a basis of a separation degree for distinguishing the first state and the second state from each other, with the selecting including setting a period on a basis of the separation degree, with the period being a period in which the mechanical equipment is in the first state, and with the at least one predetermined feature value corresponding to the period as the data for machine learning; and
generate a post-learning model by machine learning using the learning data for machine learning.

20. Mechanical equipment comprising the control apparatus according to claim 19.

21. A method for manufacturing a product by using the mechanical equipment according to claim 20.

* * * * *